(12) United States Patent
Shen et al.

(10) Patent No.: US 11,169,038 B2
(45) Date of Patent: Nov. 9, 2021

(54) SYSTEMS AND METHODS FOR WIRELESS STRAIN SENSING

(71) Applicant: Board of Regents, The University of Texas System, Austin, TX (US)

(72) Inventors: Wen Shen, Arlington, TX (US); Kenneth Reifsnider, Asheville, NC (US); Md Rassel Raihan, Arlington, TX (US); Relebohile Qhobosheane, Arlington, TX (US)

(73) Assignee: Board of Regents, The University of Texas, Austin, TX (US)

( * ) Notice: Subject to any disclaimer, the term of this patent is extended or adjusted under 35 U.S.C. 154(b) by 0 days.

(21) Appl. No.: 16/879,191

(22) Filed: May 20, 2020

(65) Prior Publication Data

US 2020/0370975 A1 Nov. 26, 2020

Related U.S. Application Data

(60) Provisional application No. 62/850,306, filed on May 20, 2019.

(51) Int. Cl.
| | |
|---|---|
| *G01L 1/24* | (2006.01) |
| *G02B 6/42* | (2006.01) |
| *G01M 11/00* | (2006.01) |

(52) U.S. Cl.
CPC ......... *G01L 1/242* (2013.01); *G01M 11/3145* (2013.01); *G02B 6/4215* (2013.01)

(58) Field of Classification Search
CPC .. G01L 1/242; G02B 6/4215; G01M 11/3145; G01M 5/0041; G01M 5/0091
See application file for complete search history.

(56) References Cited

U.S. PATENT DOCUMENTS

| | | | |
|---|---|---|---|
| 7,411,338 B1 * | 8/2008 | Sanderson | G01M 5/0041 310/339 |
| 8,250,928 B2 * | 8/2012 | Miller | B29C 65/4855 73/779 |
| 10,775,425 B2 * | 9/2020 | Godfrey | G01L 1/242 |
| 10,837,805 B2 * | 11/2020 | Godfrey | G01L 1/243 |

* cited by examiner

*Primary Examiner* — John Bedtelyon
(74) *Attorney, Agent, or Firm* — Thomas | Horstemeyer, LLP

(57) ABSTRACT

In one embodiment, a system for determining strain within a material includes a magnetostrictive sensor configured to be embedded within the material, a sensing unit configured to apply an excitation magnetic field to the material and the embedded sensor and to receive a response magnetic field that has passed through the material and the embedded sensor, wherein the sensing unit does not contact the material, and a device configured to determine a difference between the excitation magnetic field and the response magnetic field and to determine the strain within the material based upon that difference.

20 Claims, 3 Drawing Sheets

SYSTEMS AND METHODS FOR WIRELESS STRAIN SENSING

CROSS-REFERENCE TO RELATED APPLICATION

This application claims priority to U.S. Provisional Application Ser. No. 62/850,306, filed May 20, 2019, which is hereby incorporated by reference herein in its entirety.

BACKGROUND

In recent decades, composite materials have seen an increased demand in numerous engineering applications. These include wing-to-fuselage fairings, flame-retardant panels, car engine covers, tires and bumpers, radiation resistance, and electrical insulation materials. Major engineering applications of composite materials require structures with a high strength-to-weight ratio, high stiffness, fatigue durability and corrosion resistance. It has been widely observed that loading of composites results in different modes of damage.

Various techniques have been developed to detect damage to composite materials. These techniques include fiber optic sensing, ultrasonic testing, and acoustic emission testing. Unfortunately, each of these techniques has one or more drawbacks. As for fiber optic sensing, in which a plurality of optical fibers are connected to the material and a plurality of optical cables are connected to each fiber, the fibers/cables are cumbersome and hinder large-scale adoption of the technique. Regarding ultrasonic and acoustic emission testing, both techniques cannot be used to detect damage deep within a composite material.

In view of the above discussion, it can be appreciated that it would be desirable to have a system and method for sensing strain materials within materials, particularly composite materials, that avoid one or more drawbacks of current sensing techniques.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a system and method for sensing strain within materials, particularly composite materials, that avoid one or more drawbacks of current sensing techniques. Disclosed herein are examples of such systems and methods. In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Described below are systems and methods for local structural health monitoring (SHM) using sensors embedded with the material to be tested, such as composite materials (or "composites") include fiber-reinforced polymer (FRP) materials. In some embodiments, the sensors each comprise a thin film of magnetostrictive material that is embedded within the material. As used herein, the term "magnetostrictive material" refers to a magnetic material that changes shape or dimensions when a magnetic field is applied to the material, which is known as the magnetostrictive effect. The inverse magnetostrictive effect is known as the Villari effect, which shows the opposite behavior, i.e., a change in magnetization due to stress in these materials.

The above-described properties of magnetostrictive materials can be utilized to determine the stain within other materials. In particular, the strain within a material under test having an embedded magnetostrictive sensor can be determined by applying a magnetic field to the material in the vicinity of the sensor while applying tension to the material and detecting the magnetic field on the opposite side of the material after the field has passed through the material and the sensor. The change within the magnetic field, i.e., the magnetic flux change, is associated with the strain and, therefore, the change can be used to determine the magnitude of the strain. Significantly, the strain is determined wirelessly, without the need of wires, fibers, or cables that attach to the material under test. The determined strain can then be used to determine the stress within the material. Described below are examples of the aforementioned systems and methods, as well as experimental results from in situ monitoring of local strains within a fiber-reinforced polymer (FRP) material using a set of magnetostrictive sensors embedded within the material.

Figure 1A:
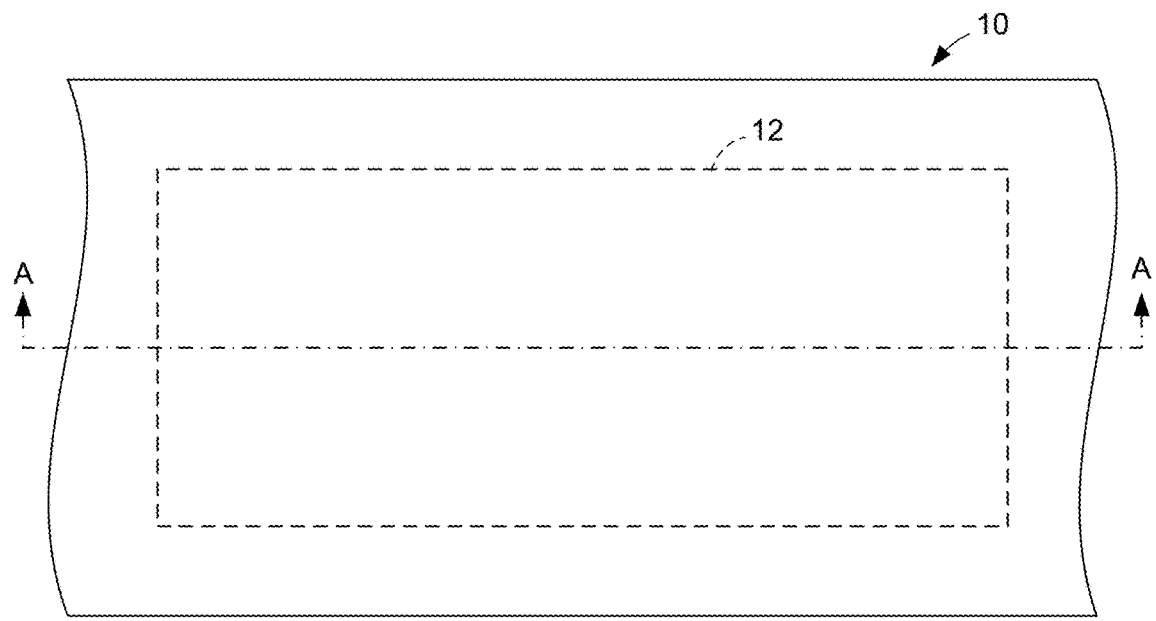
FIG. 1A is a top view of an example material having a magnetostrictive sensor embedded therein.
Figure 1B:
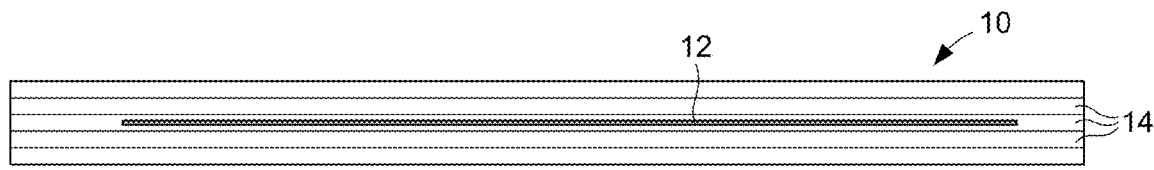
FIG. 1B is a side view of the material of FIG. 1.

FIGS. 1A and 1B illustrate an example of a material 10, such as an FRP material, in which a magnetostrictive sensor 12 is embedded. In the example of FIG. 1, the material 10 is an FRP material that comprises multiple layers or plies 14 of material that have been stacked upon each other and that have been encapsulated within a polymer. In some embodiments, each layer 14 is a fabric layer, such as a woven fabric layer formed by weaving fibers, or strands of fibers, together to form the fabric. In some embodiments, the fibers comprise one or more of glass fibers (to fabricate fiberglass), carbon fibers (to fabricate carbon fiber materials), aramid fibers, or basalt fibers. In some embodiments, the polymer comprises one or more of epoxy, vinyl ester, or polyester thermosetting plastic.

As shown in FIG. 1B, the magnetostrictive sensor 12 is positioned within the material 10 between its layers 14 (e.g., on one of the inner layers of the material). Accordingly, like the layers 14, the sensor 12 is embedded within the polymer. In some embodiments, the sensor 12 is comprises a thin film of magnetostrictive material. Examples of suitable magnetostrictive materials for use as a sensor 12 include $Fe_{15}Ni_{15}B_9Mo$ (FeNiBMo) and $Fe_7SiB$ (FeSiB). By way of example, the thin film can be approximately 10 to 30 µm thick and have a length (which is larger than the width) of approximately 2 to 4 mm.

The magnetostrictive sensor 12 is added to the material 10 during the material's fabrication and the sensor can either be fabricated separately or fabricated on one of the layers 14 of the material during its fabrication. In some embodiments, the magnetostrictive material is deposited on a substrate, such as a silicon substrate, using vacuum sputtering and photolithography or shadow masking. The fabricated thin film can then be separated from the substrate and placed on one of the layers 14 before the other layers have been applied to form the material 10. In other embodiments, bulk magnetostrictive material is broken into micro-scale fragments, e.g., by dicing, and resulting fragments are directly deposited on the material layer 14 to form a thin film on it. The surfaces of the thin film (either of the deposited film or the bulk material prior to dicing) can be roughened using mechanical abrasion to obtain better adhesion between the sensor surfaces and the material and, therefore, more accurate measurements.

Figure 2:
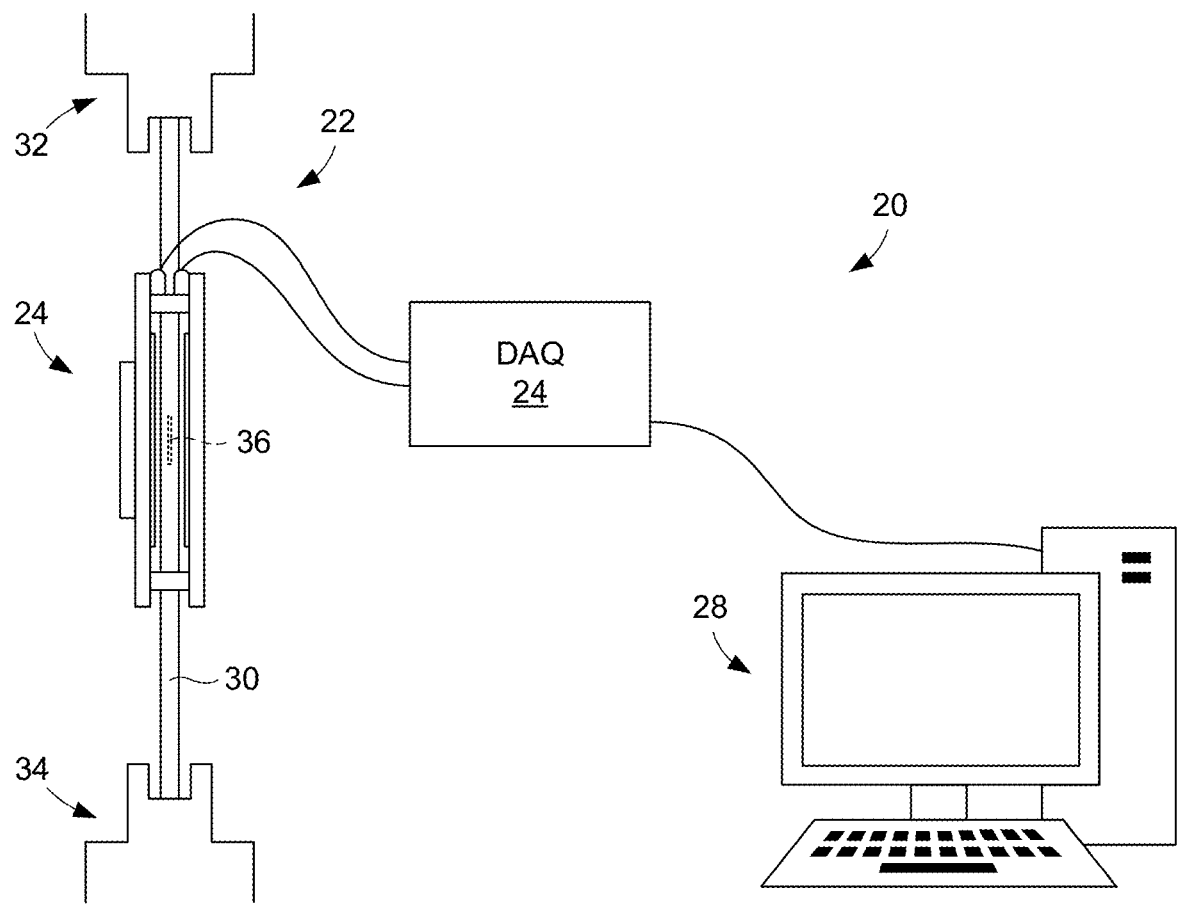
FIG. 2 is a schematic view of an embodiment of a system for wirelesses sensing strain within a material.

FIG. 2 illustrates an embodiment of a system 20 for sensing strain within a material in which one or more magnetostrictive sensors are embedded. As shown in the figure, the system 20 includes a tensioning apparatus 22, a sensing apparatus 24, a data acquisition unit (DAQ) 26, and a computing device 28. The tensioning apparatus 22 is configured to apply tension to a material 30 under test to enable sensing of strain within the material. The tensioning apparatus 22 includes a first clamp 32 that securely grips a first end of the material 30 and a second clamp 34 that securely grips a second, opposite end of the material. During operation of the system 10, the clamps 32, 34 apply a tensioning force generated by one or more actuators (not shown).

The sensing unit 24 surrounds the material 30 under test without contacting it and is configured to apply a first (excitation) magnetic field to the material as well as receive a second (response) magnetic field that results after the sensor 36 is excited by the first magnetic field. An example embodiment of the sensing unit 24 is described in further detail below in reference to FIG. 3.

The data acquisition unit 26 is configured to deliver an excitation signal to the sensing unit 24 and receive a response signal from the sensing unit. The data acquisition unit 26 can include a signal generator that generates the excitation signal (e.g., based upon commands received from the computing device 28), an amplifier that amplifies the received response signals, and an analog-to-digital converter that converts the response signals into digital response signals that can be transmitted to the computing device.

The computing device 28 is configured to receive the digital response signals and analyze them. As described below, this analysis can comprise determining the strain from the response signal and determining stress from the determined strain.

Figure 3:
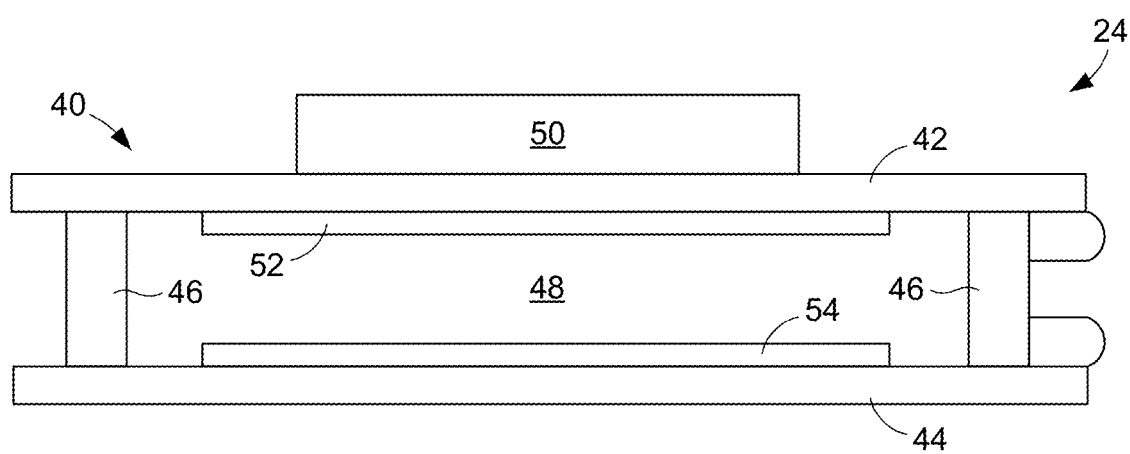
FIG. 3 is a side view of a sensing unit that can be used in the system of FIG. 3.

With reference to FIG. 3, illustrated is an embodiment for the sensing unit 24 shown in FIG. 2. As shown in FIG. 3, the sensing unit 24 comprises a frame 40 that includes opposed first and second plates 42 and 44 that are separated by spacers 46. Because of the presence of the spacers 46, there is a void 48 created between the plates 42, 44 that provides space through which the material 30 can be passed. The plates 42, 44 each have an inner side that faces the void 48 and an outer side that faces away from the void. Mounted to the outer side of the first plate 42 is a block magnet 50 that applies a direct current (DC) biasing magnetic field to the magnetostrictive sensor 36. Mounted to the inner side of the first plate 42 is an excitation coil 52 that is configured to receive an alternating current (AC) excitation signal from the data acquisition unit 26 and, in response, generate the excitation magnetic field that is applied to the sensor 36. Mounted to the inner side of the second plate 44 is a sensing coil 54 that receives the response magnetic field that results when the excitation field passes through the material 36 and its sensor 36. By way of example, each coil 52, 54 comprises a 3 µm thick, 20 µm wide, planar copper coil formed on an $SiO_2$ substrate that includes 1,000 coil turns with each turn being spaced from its adjacent turns by 20 µm.

Finally, with further reference to FIG. 3, the sensing unit 24 also includes a first contact 56 in electrical communication with the excitation coil 52 and a second contact 58 in electrical communication with the sensing coil 54. These contacts 52, 54 enable an excitation signal to be delivered from the data acquisition unit 24 to the excitation coil 52 and a response signal to be delivered from the sensing coil 54 to the data acquisition unit.

A study was performed to evaluate the effectiveness of a system and method like those described above. Two types of magnetostrictive materials were selected for the study: an iron-nickel based alloy (Type 1 sensor) and an iron-boron-silicon alloy (Type 2 sensor). The magnetostriction of the Type 1 sensors was 12 ppm and the magnetostriction of the Type 2 sensors was 27 ppm. The surface properties of the sensor materials were considered by investigating the surface energy of the materials. The surface energy was determined using a Kruss™ mobile surface analyzer (MSA). The MSA uses two liquids, i.e., water as the polar liquid and diiodomethane as the nonpolar liquid, to determine the surface energy. Two drops of these liquids were then placed on the surface of the magnetostrictive sensor and the contact angles were determined. The results of the surface energies for the sensor materials are shown in Table 1.

TABLE 1

Surface Energy for the Magnetostrictive Sensors

| Sensor Types | Disperse (mN/m) | Polar (mN/m) | Surface Free Energy (mN/m) |
|---|---|---|---|
| Smooth Sensor Surfaces | | | |
| Type 1 sensor | 31.96 ± 0.98 | 0.34 ± 0.01 | 32.30 ± 0.97 |
| Type 2 sensor | 33.76 ± 0.63 | 0.22 ± 0.03 | 33.98 ± 0.60 |
| Rough Sensor Surfaces | | | |
| Type 1 sensor | 46.69 ± 1.25 | 0.12 ± 0.03 | 46.81 ± 0.95 |
| Type 2 sensor | 47.43 ± 0.23 | 0.31 ± 0.02 | 47.74 ± 0.21 |

The surface energies of the smooth sensor surfaces were 32.30 mN/m and 33.98 mN/m and surface energies of the rough sensor surfaces were 46.81 mN/m and 47.74 mN/m for the Type 1 and Type 2 sensors, respectively. This indicated a better adhesion between the rough sensor surfaces and the FRC in comparison with the smooth sensor surfaces.

The dimensions of the sensors made from these two types of materials were 2 cm by 4 cm by 15 µm. These dimensions were selected to provide sufficient sensor surface areas and small thickness as compared to the thickness of each composite layer. Glass fiber-reinforced polymer (GFRP) composite materials were used in the study. The composite materials were fabricated using vacuum-assist resin-transfer molding (VAR™). Four layers of fabric (20 cm×20 cm) oriented at 0° were cut and positioned in the mold. Magnetostrictive sensors were placed between two layers to fabricate a material having an embedded sensor. Upon curing, the materials having embedded with sensors were cut into strips of 15 cm×1 cm×0.2 cm. Six samples of the embedded composite materials were tested for each sensor with uniaxial quasistatic tensile loading under displacement control using an MTS™ servo-hydraulic test system. Two planar coils were placed close to both sides of the composite surfaces during each test. One coil was used to send excitation to the sensor while the other was used to pick up the magnetic flux change during the tensile loading. Each sample was loaded close to rupture, which was within the range of 5 to 6 kN. The rupture tension was determined in previous tension testing. Continuous measurements were taken at 100 kHz and 50 kHz.

Next, the response of the sensor-embedded materials were analyzed. The sensor response under uniaxial tensile loading is related to the composite strain. Continuous measurements were obtained during loading and were halted immediately before rupture. The sensor response data showed consistent response and repeatable outputs.

Figure 4A:
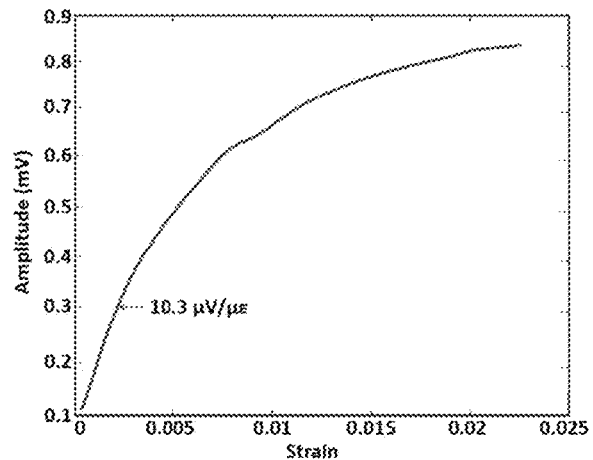
FIG. 4A is a graph that shows the determined strain for a composite material have a Type 1 sensor (100 kHz and 50 kHz measurements).
Figure 4B:
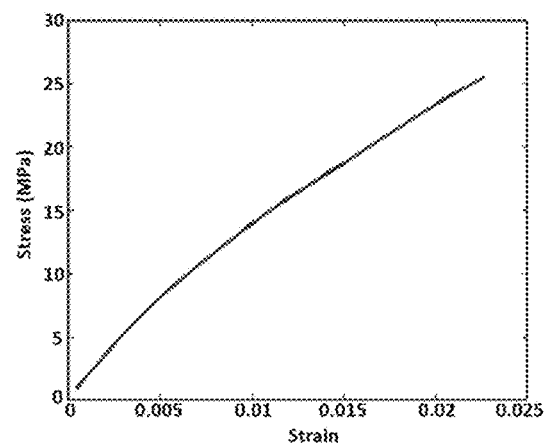
FIG. 4B is a graph that shows the stress within the composite material.

The response of the material having an embedded Type 1 sensor during continuous tensile loading is shown in FIG. 4A. The sensor output amplitude linearly increased at low strains. With further increase in strain, however, the sensor output amplitude showed a considerable non-linear response. This phenomenon was likely due to the different elastic properties between the sensor and the GFRP composite material. With the 100 kHz detection frequency, the sensor output amplitude increased nearly linearly with the increase in strain up to 0.8% ε and continued to increase with a less steep slope until it reached a maximum at 2.3% E. For the 50 kHz measurement, the sensor output amplitude increased nearly linearly with the increase in strain up to 0.4% ε and continued to increase with a less steep slope until it reaches a maximum at 1.5% E. The sensor output past this point provided a steady response as the overall composite strain continued to increase. The sensitivity shown by the Type 1 sensor for the measurement at 100 kHz was 4.12 μV/με, while the sensitivity at the 50 kHz was 6.667 μV/με, as summarized in Table 2 below. As shown in FIG. 4B, the determined strain was then used to determine the associated stress based on known properties of the composite material.

TABLE 2

Responses of Composite Materials Having an Embedded Sensor

| Sample Type | Frequency | Strain at Sensor Peak Response | Sensitivity (μV/με) | Max Stress (MPa) |
|---|---|---|---|---|
| GFRC embedded with Sensor Type 1 | 100 kHz | 0.021 | 4.12 | 25.15 |
| | 50 kHz | 0.0145 | 6.67 | 21.26 |
| GFRC embedded with Sensor Type 2 | 100 kHz | 0.0231 | 5.70 | 24.37 |
| | 50 kHz | 0.009 | 10.30 | 20.12 |

Figure 5A:
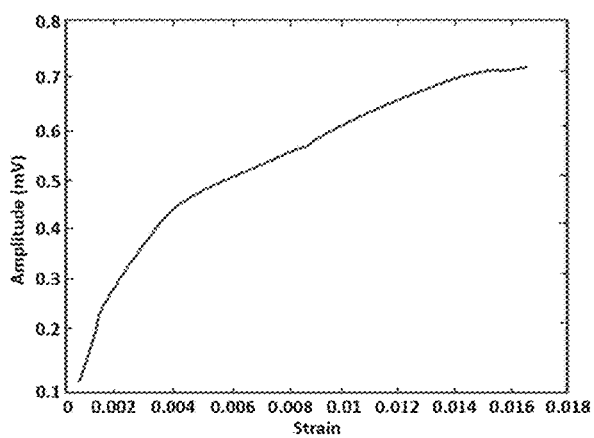
FIG. 5A is a graph that shows the determined strain for a composite material have a Type 2 sensor (100 kHz and 50 kHz measurements).
Figure 5B:
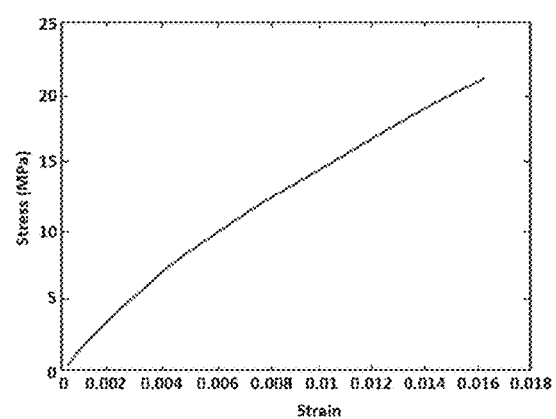
FIG. 5B is a graph that shows the stress within the composite material.

FIG. 5A shows the response of the material having an embedded Type 2 sensor during continuous tensile loading and FIG. 5B shows the associated stress. The sensor amplitude at low strains increased linearly with strain and, upon further loading, the slope of the sensor amplitude decreased as the strain continued to increase. The sensitivity shown by the Type 2 sensor was 5.7 μV/με at 100 kHz and 10.30 μV/με at 50 kHz, as summarized in Table 2 above. Compared with 30 μm thick sensors that were previously tested by the inventors, the thinner embedded sensors provided greater strain sensitivities at larger ranges of strains, covering both low-strain and high-strain regions.

The above disclosure establishes the feasibility of using wireless embedded magnetostrictive sensors for in situ strain sensing of materials, including composite materials. The tested magnetostrictive sensors having a thickness of 15 μm embedded within composites exhibited high sensitivity to a large range of tensile strains and, therefore, provides a viable alternative to in situ strain sensing of materials.

The invention claimed is:

1. A system for determining strain within a material, the system comprising:
   a magnetostrictive sensor configured to be embedded within the material;
   a sensing unit configured to apply an excitation magnetic field to the material and the embedded sensor and to receive a response magnetic field that has passed through the material and the embedded sensor, wherein the sensing unit does not contact the material; and
   a device configured to determine a difference between the excitation magnetic field and the response magnetic field and to determine the strain within the material based upon that difference.

2. The system of claim 1, wherein the magnetostrictive sensor is a thin film comprising a magnetostrictive material.

3. The system of claim 2, wherein the thin film is approximately 10 to 30 μm thick.

4. The system of claim 2, wherein the magnetostrictive material comprises FeNiBMo.

5. The system of claim 2, wherein the magnetostrictive material comprises FeSiB.

6. The system of claim 1, wherein the material is a composite material comprising multiple layers of fabric that are encapsulated within a polymer and wherein the magnetostrictive sensor is positioned between two layers of the composite material.

7. The system of claim 1, wherein the sensing unit comprises an excitation coil configured to be positioned on one side of the material and a sensing coil configured to be positioned on the other side of the material, wherein the excitation coil is configured to apply the excitation magnetic field and the sensing coil is configured to receive the response magnetic field.

8. The system of claim 7, further comprising a data acquisition unit configured to send an excitation signal to the excitation coil and receive a response signal from the sensing coil.

9. The system of claim 8, wherein the data acquisition unit is further configured to transmit a digital signal indicative of the difference between the excitation magnetic field and the response magnetic field to the device.

10. The system of 9, wherein the device comprises a computing device that is configured to compute the strain within the material based upon the received digital signal.

11. The system of claim 10, wherein the computing device is further configured to compute strain within the material based upon the computed strain.

12. The system of claim 1, wherein the sensing unit further comprises a block magnet that applies a biasing magnetic field to the material.

13. The system of claim 1, further comprising a tensioning apparatus a configured to apply tension to the material while the excitation magnetic field is applied and the response magnetic field is received.

14. A method for sensing strain within a material, the method comprising:
   providing a magnetostrictive sensor within the material;

applying a force to the material;

applying an excitation magnetic field to the material and the embedded sensor;

receiving a response magnetic field that has passed through the material and the embedded sensor;

determining a difference between the excitation magnetic field and the response magnetic field; and determining the strain within the material based upon the difference between the excitation magnetic field and the response magnetic field.

15. The method of claim 14, wherein providing a magnetostrictive sensor within the material comprises providing the sensor between two layers of the material.

16. The method of claim 15, wherein providing a magnetostrictive sensor comprises separately fabricating the sensor and then placing it on an inner layer of the material during fabrication of the material.

17. The method of claim 15, wherein providing a magnetostrictive sensor comprises directly depositing magnetostrictive material on one of the inner layers of the material during fabrication of the material.

18. The method of claim 14, wherein the magnetostrictive sensor is a thin film having a thickness of approximately 10 to 30 µm thick.

19. The method of claim 14, further comprising determining a stress within the material based upon the determined strain.

20. A piece of composite material, comprising:

multiple layers of fiber material encapsulated within a polymer; and a magnetostrictive sensor embedded within the material between two layers of the material;

wherein a magnitude of strain within the material can be determined by applying a force to the material, applying an excitation magnetic field to the sensor, and receiving a response magnetic field that reflects a magnetic flux change that is indicative of the strain within the material.

* * * * *